(12) United States Patent
Gao et al.

(10) Patent No.: US 10,973,362 B2
(45) Date of Patent: Apr. 13, 2021

(54) COOKING APPARATUS, CONTROL METHOD THEREOF AND CONTROL DEVICE

(71) Applicant: FOSHAN SHUNDE MIDEA ELECTRICAL HEATING APPLIANCES MANUFACTURING CO., LTD, Foshan (CN)

(72) Inventors: Wanbao Gao, Foshan (CN); Xingguo Yang, Foshan (CN)

(73) Assignee: FOSHAN SHUNDE MIDEA ELECTRICAL HEATING APPLIANCES MANUFACTURING CO., LTD., Foshan (CN)

(*) Notice: Subject to any disclaimer, the term of this patent is extended or adjusted under 35 U.S.C. 154(b) by 231 days.

(21) Appl. No.: 16/141,629

(22) Filed: Sep. 25, 2018

(65) Prior Publication Data

US 2019/0029459 A1   Jan. 31, 2019

Related U.S. Application Data

(63) Continuation of application No. PCT/CN2017/092120, filed on Jul. 6, 2017.

(30) Foreign Application Priority Data

Jul. 6, 2017 (CN) .......................... 201710308000.1

(51) Int. Cl.
*A47J 27/08* (2006.01)
*A47J 27/00* (2006.01)
(Continued)

(52) U.S. Cl.
CPC ......... *A47J 27/0802* (2013.01); *A47J 27/004* (2013.01); *A47J 27/086* (2013.01); *A47J 27/09* (2013.01)

(58) Field of Classification Search
CPC .... A47J 27/004; A47J 27/0802; A47J 27/086; A47J 27/09; A47J 31/08; A47J 31/0817
(Continued)

(56) References Cited

U.S. PATENT DOCUMENTS

| 4,246,955 A | * | 1/1981 | Skala | A47J 27/16 165/104.14 |
| 4,601,004 A | * | 7/1986 | Holt | A47J 37/1266 700/300 |

(Continued)

FOREIGN PATENT DOCUMENTS

| JP | 2938694 B2 | 8/1999 |
| JP | 2007-044411 A | 2/2007 |

OTHER PUBLICATIONS

Foshan Shunde Midea Electrical Heating Appliances Manufacturing Co. Ltd., Extended European Search Report, EP 17842311.7, dated Dec. 6, 2018, 8 pgs.

*Primary Examiner* — Ibrahime A Abraham
*Assistant Examiner* — Frederick F Calvetti
(74) *Attorney, Agent, or Firm* — Morgan, Lewis & Bockius LLP

(57) ABSTRACT

A pressure cooking apparatus, a method and device for controlling the same are provided. During a heating process of the apparatus, the device detects a pressure value inside the inner liner, a first temperature value when the detected pressure value rises to a first preset pressure threshold, and a second temperature value when the detected pressure value drops from the preset first pressure threshold to a second preset pressure threshold. Next the device acquires a temperature reference value according to a preset setting strategy using the first temperature value and the second temperature value and then compares a current temperature value detected by the temperature sensor with the temperature reference value. Finally, the device starts or stops the (Continued)

heating process based on the comparison result, thus reducing the on/off frequency of the apparatus and controlling the pressure inside the cooking apparatus more precisely and smoothly.

12 Claims, 5 Drawing Sheets

(51) Int. Cl.
    *A47J 27/086*     (2006.01)
    *A47J 27/09*     (2006.01)

(58) Field of Classification Search
    USPC .......................................... 99/337; 219/440
    See application file for complete search history.

(56) References Cited

U.S. PATENT DOCUMENTS

| | | | | |
|---|---|---|---|---|
| 4,636,949 | A * | 1/1987 | Longabaugh | G05B 19/042 219/442 |
| 4,782,445 | A * | 11/1988 | Pasquini | A21B 1/40 700/90 |
| 4,812,625 | A * | 3/1989 | Ceste, Sr. | A47J 37/1266 219/442 |
| 5,240,725 | A * | 8/1993 | Akamatsu | F24C 3/126 426/233 |
| 5,575,194 | A * | 11/1996 | Maher, Jr. | A47J 27/0802 219/494 |
| 5,582,755 | A * | 12/1996 | Maher, Jr. | A47J 37/1266 219/492 |
| 5,596,514 | A * | 1/1997 | Maher, Jr. | A47J 27/0802 700/300 |
| 5,827,556 | A * | 10/1998 | Maher, Jr. | A47J 37/1266 426/233 |
| 5,938,961 | A * | 8/1999 | Maher, Jr. | G05D 23/1951 219/442 |
| 6,018,150 | A * | 1/2000 | Maher, Jr. | G05D 23/1913 219/441 |
| 6,381,518 | B1 * | 4/2002 | Huffington | G05D 23/1919 219/497 |
| 6,717,117 | B2 * | 4/2004 | Blanchard | H05B 3/746 219/412 |
| 7,718,928 | B2 * | 5/2010 | He | A47J 27/0817 219/431 |
| 9,320,388 | B2 * | 4/2016 | Storek | A23L 5/15 |
| 10,582,806 | B2 * | 3/2020 | Casey | A47J 37/1276 |
| 10,721,948 | B1 * | 7/2020 | Swayne | A23L 5/17 |
| 2011/0003048 | A1 * | 1/2011 | Sugimoto | A47J 27/086 426/509 |
| 2012/0034354 | A1 * | 2/2012 | Board | H05B 6/80 426/392 |
| 2016/0198883 | A1 * | 7/2016 | Wang | A47J 27/004 426/231 |
| 2018/0310747 | A1 * | 11/2018 | Wang | A47J 27/004 |
| 2019/0174962 | A1 * | 6/2019 | Mosebach | A47J 27/004 |
| 2020/0085225 | A1 * | 3/2020 | Kim | H05B 6/1245 |
| 2020/0146496 | A1 * | 5/2020 | Patadia | A47J 44/00 |

\* cited by examiner

COOKING APPARATUS, CONTROL METHOD THEREOF AND CONTROL DEVICE

RELATED APPLICATIONS

This application is a continuation application of PCT Patent Application No. PCT/CN2017/092120, entitled "COOKING APPARATUS, CONTROL METHOD THEREOF AND CONTROL DEVICE" filed on Jul. 6, 2017, which claims priority to Chinese Patent Application No. 201710308000.1, filed with the Chinese Patent Office on May 4, 2017, and entitled "COOKING APPARATUS, CONTROL METHOD THEREOF AND CONTROL DEVICE", all of which are incorporated herein by reference in their entirety.

TECHNICAL FIELD

The present disclosure relates to the field of household appliances, and in particular to a method for controlling a cooking apparatus, a device for controlling a cooking apparatus, and a cooking apparatus.

BACKGROUND

At present, a displacement-based pressure switch is usually used to control heating for all electric pressure cookers, with an overall controlling scheme as follows. After the pressure switch is turned on (i.e., in an ON state), a heater of the electric pressure cooker is powered for heating, during which a pressure value inside the electric pressure cooker rises gradually, thus enabling the pressure switch to have an increasing displacement. When the increasing displacement reaches to a certain distance, the pressure switch will be turned off (i.e., in an OFF state), so that the heater is controlled to stop heating, resulting in a decreasing temperature value and thus a decreasing pressure value inside the electric pressure cooker. When the deceasing pressure value drops to a certain range, the pressure switch then will be turned on again, so that the heater will be powered again for heating. With such a cycle, it is possible to control the pressure value inside the electric pressure cooker to maintain in a predetermined range.

With such a controlling scheme, the pressure switch will be moved frequently, thus adversely affecting service life of the pressure switch and further shortening service life of the electric pressure cooker. Besides, since the pressure value inside the electric pressure cooker is related to the displacement of the pressure switch, a range over which the pressure value can be maintained is affected by accuracy of the pressure switch. Further, because the pressure switch is likely to become invalid, the electric pressure cooker is at a risk of abnormal high pressure or pressure leakage.

SUMMARY

In order to solve the above technical problems, the present disclosure is to provide a method for controlling a cooking apparatus, a device for controlling a cooking apparatus, and a cooking apparatus, which are capable of prolonging service life of the cooking apparatus and controlling a pressure value inside the cooking apparatus to be maintained in a certain range in such a more precise way that cooking safety is improved.

Technical solutions of the present disclosure are implemented as follows.

According to a first aspect, an embodiment of the present disclosure provides a method for controlling a cooking apparatus, in which the pressure cooking apparatus includes a heating unit, an inner liner, a pressure detecting unit and a temperature sensor, and the method includes:

detecting by the pressure detecting unit a pressure value inside the inner liner during a heating process of the heating unit;

detecting by the temperature sensor a first temperature value when the detected pressure value rises to a first preset pressure threshold;

detecting by the temperature sensor a second temperature value when the detected pressure value drops from the preset first pressure threshold to a second preset pressure threshold;

acquiring a temperature reference value according to a preset setting strategy using the first temperature value and the second temperature value; and comparing a current temperature value detected by the temperature sensor with the temperature reference value, and controlling the heating unit to start or stop based on a comparison result.

According to an embodiment of the present disclosure, acquiring a temperature reference value according to a preset setting strategy using the first temperature value and the second temperature value further includes: setting one temperature value within a range from the first temperature value to the second temperature value as the temperature reference value, in which the temperature reference value is less than the first temperature value and not less than the second temperature value.

According to an embodiment of the present disclosure, acquiring a temperature reference value according to a preset setting strategy using the first temperature value and the second temperature value further includes: acquiring the temperature reference value Tm according to a formula as below:

$$T_m = \frac{(T_1 + T_2)}{2} + T_{corrected}$$

where T1 is the first temperature value, T2 is the second temperature value and $T_{corrected}$ is a corrected temperature value preset.

According to an embodiment of the present disclosure, controlling the heating unit to start or stop based on a comparison result further includes: controlling the heating unit to stop if the current temperature value is greater than or equal to the temperature reference value; controlling the heating unit to start if the current temperature value is less than the temperature reference value.

According to an embodiment of the present disclosure, the method further includes controlling the heating unit to stop when the detected pressure value rises to the preset first pressure threshold.

According to an embodiment of the present disclosure, the method further includes controlling the heating unit to start when the detected pressure value drops from the preset first pressure threshold to the second preset pressure threshold.

According to an embodiment of the present disclosure, after controlling the heating unit to start or stop based on a comparison result, the method further includes: detecting by the temperature sensor a third temperature value when the detected pressure value rises to the preset first pressure threshold again; and updating the temperature reference value according to the preset setting strategy using the third temperature value and the second temperature value.

According to a second aspect, an embodiment of the present disclosure provides a device for controlling a pressure cooking apparatus, including:

a pressure detecting unit configured to detect a pressure value inside an inner liner in the pressure cooking apparatus;

a temperature sensor configured to detect a temperature value inside the inner liner;

a controlling module configured to: in a heating process, detect by the temperature sensor a first temperature value when the detected pressure value rises to a first preset pressure threshold;

detect by the temperature sensor a second temperature value when the detected pressure value drops from the preset first pressure threshold to a second preset pressure threshold;

acquire a temperature reference value according to a preset setting strategy using the first temperature value and the second temperature value; and compare a current temperature value detected by the temperature sensor with the temperature reference value, and control the heating unit to start or stop based on a comparison result.

According to an embodiment of the present disclosure, the controlling module is further configured to set one temperature value within a range from the first temperature value to the second temperature value as the temperature reference value, in which the temperature reference value is less than the first temperature value and not less than the second temperature value.

According to an embodiment of the present disclosure, the controlling module is further configured to acquire the temperature reference value Tm according to a formula as below:

$$T_m = \frac{(T_1 + T_2)}{2} + T_{corrected}$$

where T1 is the first temperature value, T2 is the second temperature value and $T_{corrected}$ is a corrected temperature value preset.

According to an embodiment of the present disclosure, the controlling module is further configured to:

control the heating unit to stop if the current temperature value is greater than or equal to the temperature reference value;

control the heating unit to start if the current temperature value is less than the temperature reference value.

According to an embodiment of the present disclosure, the controlling module is further configured to control the heating unit to stop when the pressure value detected by the pressure detecting unit rises to the preset first pressure threshold.

According to an embodiment of the present disclosure, the controlling module is further configured to control the heating unit to start when the pressure value detected by the pressure detecting unit drops from the preset first pressure threshold to the second preset pressure threshold.

According to an embodiment of the present disclosure, after controlling the heating unit to start or stop based on a comparison result, the controlling module is further configured to: detect by the temperature sensor a third temperature value when the pressure value detected by the pressure detecting unit rises to the preset first pressure threshold again; and update the temperature reference value according to the preset setting strategy using the third temperature value and the second temperature value.

According to a third aspect, an embodiment of the present disclosure further provides a cooking apparatus which includes the device for controlling the cooking apparatus described above.

In addition, an embodiment of the present disclosure also provides a non-transitory computer-readable storage medium having stored therein a computer program that, when executed by a processor, causes the processor to perform the above-described methods for controlling the cooking apparatus.

With the cooking apparatus and the method and device for controlling the cooking apparatus according to embodiments of the present disclosure, the heating unit of the cooking apparatus is controlled to start or stop based on the temperature value detected by the temperature sensor, thereby reducing use frequency of the pressure detecting unit, prolonging service life of the cooking apparatus, and controlling the pressure value inside the inner liner of the cooking apparatus in such a more precise and stable way that cooking safety is improved greatly.

DETAILED DESCRIPTION

Figure 1:
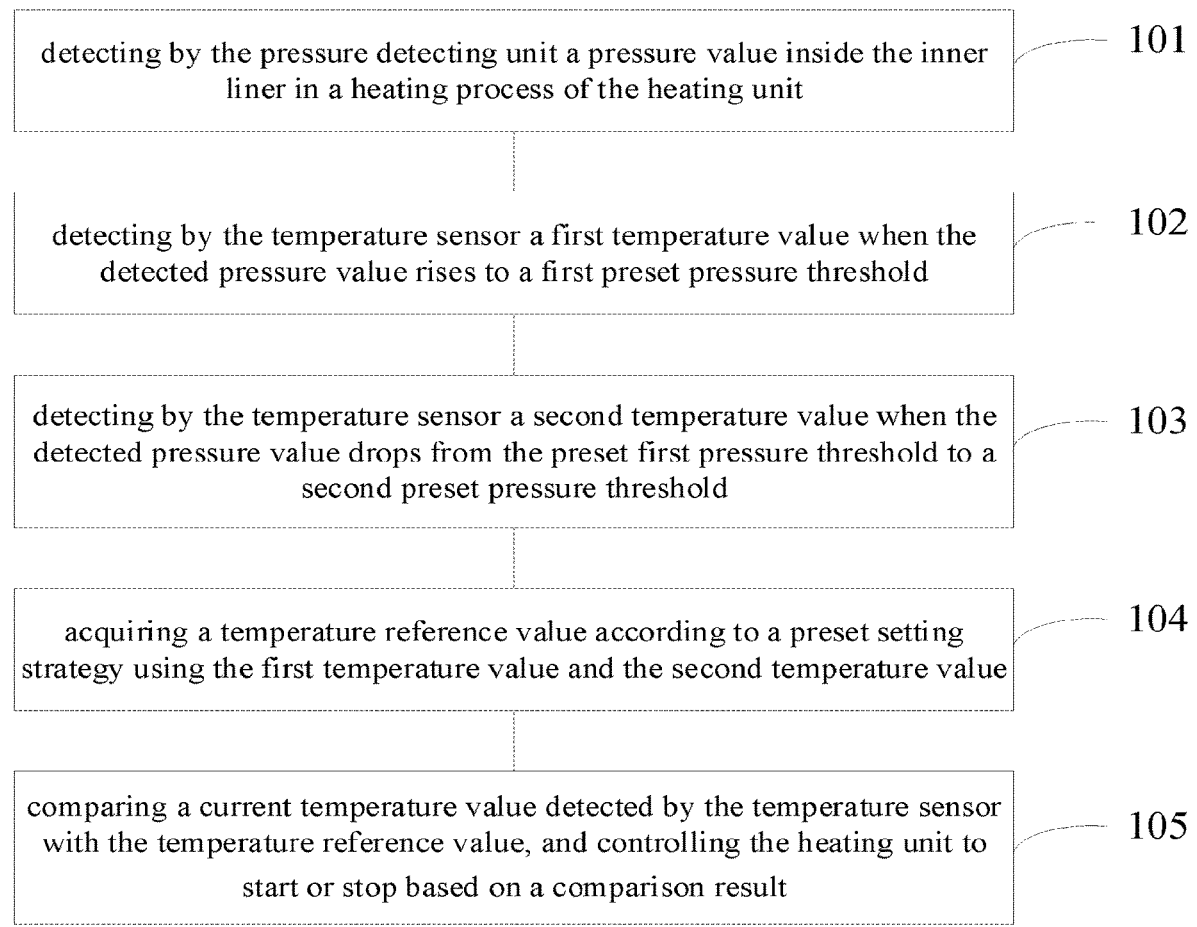
FIG. 1 is a schematic flow chart showing a method for controlling a cooking apparatus according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Before describing embodiments of the present disclosure in detail, it should be firstly explained that, since an inner liner of a cooking apparatus is of a constant volume, a relationship between a temperature value and a pressure value inside the inner liner of the cooking apparatus can be determined according to the Ideal Gas Law, i.e., pV=nRT, where R is a gas constant; p is a pressure of gas in Pa; V is a gas volume in m3; n is an amount of substance of gas in mol, T is a gas temperature in K. Based on the Ideal Gas Law, the gas temperature is directly proportional to the gas pressure on a premise of a constant gas volume owing to the constant volume of the inner liner of the cooking apparatus. Therefore, a conclusion can be obtained for the cooking apparatus: controlling the gas pressure inside the inner liner is equivalent to controlling the gas temperature inside the inner liner. Based on this conclusion, the following embodiments of the present disclosure are proposed.

Embodiment 1

Referring to FIG. 1, a method for controlling a cooking apparatus according to an embodiment of the present disclosure is shown. The pressure cooking apparatus includes a heating unit, an inner liner, a pressure detecting unit, and a temperature sensor. The method includes the following steps:

S101: detecting by the pressure detecting unit a pressure value inside the inner liner during a heating process of the heating unit;

S102: detecting by the temperature sensor a first temperature value when the detected pressure value rises to a first preset pressure threshold;

S103: detecting by the temperature sensor a second temperature value when the detected pressure value drops from the preset first pressure threshold to a second preset pressure threshold;

S104: acquiring a temperature reference value according to a preset setting strategy using the first temperature value and the second temperature value; and S105: comparing a current temperature value detected by the temperature sensor with the temperature reference value, and controlling the heating unit to start or stop based on a comparison result.

Figure 2:
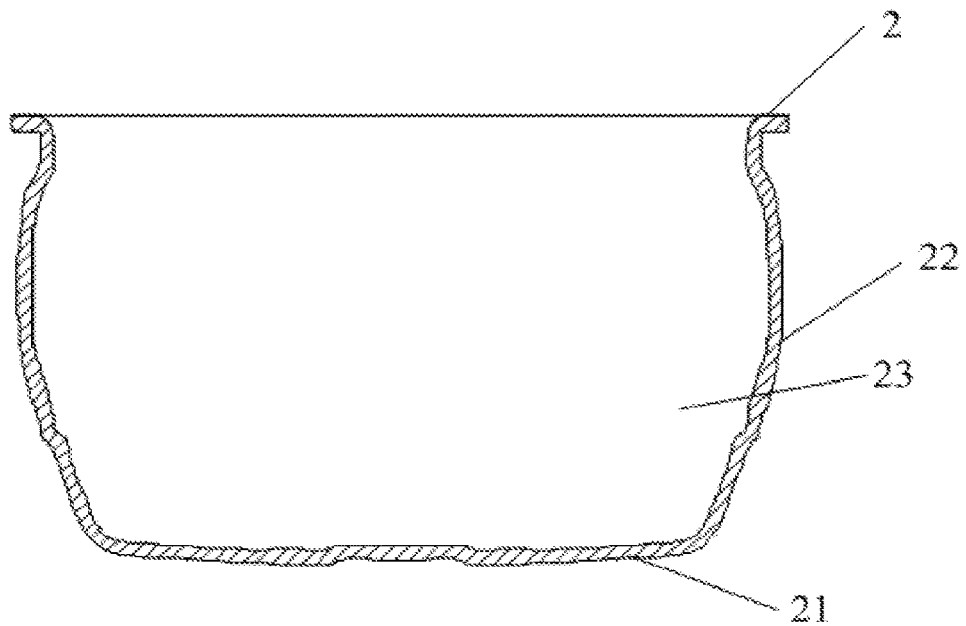
FIG. 2 is a schematic structural diagram of an inner liner according to an embodiment of the present disclosure.

It should be noted that the technical solution as shown in FIG. 1 may be applied to a cooking apparatus having an inner liner, and the cooking apparatus may further include an upper cover and a pot body. The inner liner is disposed in the pot body and the upper cover is disposed above the pot body and connected to the pot body so as to seal the inner liner when the upper cover and the pot body are closed. As shown in FIG. 2, a bottom 21 and a side wall 22 of the inner liner 2 form an inner cavity 23 for containing a cooking ingredient. It can be known from the above description for the cooking apparatus that the cooking apparatus may preferably be a cooking utensil such as an electric pressure cooker, a rice cooker or the like.

With the technical solution as shown in FIG. 1, it can be seen that, since the gas temperature is in direct proportion to the gas pressure, the heating unit of the cooking apparatus can be controlled to start or stop based on the temperature value detected by the temperature sensor after the temperature reference value is determined with the temperature values corresponding to the pressure values detected by the pressure detecting unit, thereby reducing use frequency of the pressure detecting unit, thus preventing the pressure detecting unit such as a pressure switch from damage and prolonging service life of the cooking apparatus, and controlling the pressure value inside the inner liner of the cooking apparatus in a more precise and stable way.

In general, the pressure detecting unit of the cooking apparatus may detect the pressure value indirectly by detecting with a magnetic sensor, such as a magnetic float, which will rise under increasing pressure or by detecting with a temperature sensor based on the Ideal Gas Law, or the like. In this embodiment, the pressure detecting unit may be a displacement-based pressure switch, which will have an increasing displacement as the pressure value inside the inner liner of the cooking apparatus rises. Accordingly, the pressure value inside the inner liner of the cooking apparatus can be characterized by the displacement. When the pressure value reaches to a certain threshold, enabling the pressure switch to move a larger displacement, the pressure switch will be turned off, so that the heating unit of the cooking apparatus is controlled to stop heating; and when the pressure value drops again, the pressure switch itself will be turned on again owing to the decreased displacement, so that the heating unit of the cooking apparatus is controlled to start heating again.

Therefore, when the detected pressure value rises to the preset first pressure threshold, the method as shown in FIG. 1 further includes: controlling the heating unit to stop.

It should be noted that, after the heating unit is controlled to stop, gas inside the inner liner of the cooking apparatus will be naturally cooled down with a decreasing temperature, so that the pressure value inside the inner liner will also drop based on the Ideal Gas Law. When the pressure value drops to the second preset pressure threshold, the second temperature value is detected by the temperature sensor at this moment.

Further, when the pressure value inside the inner liner drops to the second pressure threshold, the pressure switch starts to be turned on again. Accordingly, the method as shown in FIG. 1 further includes: controlling the heating unit to start, heating the inner liner of the cooking apparatus again.

By the reason that the heating unit is controlled to stop heating when the pressure value detected by the pressure detecting unit rises to the first pressure threshold, after which the heating unit will be controlled to start heating again when the pressure value detected by the pressure detecting unit drops to the second pressure threshold, the pressure value detected by the pressure detecting unit will rise to the first pressure threshold more than one time and will also drop to the second pressure threshold more than one time.

Therefore, for the step S102, the first temperature value may be detected when the detected pressure value rises to the preset first pressure threshold for the first time or the second, third, or more times, which is not specifically limited in this embodiment.

Similarly, for the step S103, the second temperature value may be detected when the detected pressure value drops from the preset first pressure threshold to the second preset pressure threshold for the first time, or the second, third, or more times, which is not specifically limited in this embodiment.

Preferably, in an embodiment of the present disclosure, for the step S104, acquiring a temperature reference value according to a preset setting strategy using the first temperature value and the second temperature value may further includes:

setting one temperature value within a range from the first temperature value to the second temperature value as the temperature reference value, in which the temperature reference value is less than the first temperature value and not less than the second temperature value.

Preferably, in another embodiment of the present disclosure, for the step S104, acquiring a temperature reference value according to a preset setting strategy using the first temperature value and the second temperature value may further include:

acquiring the temperature reference value Tm according to a formula as below:

$$T_m = \frac{(T_1 + T_2)}{2} + T_{corrected}$$

where T1 is the first temperature value, T2 is the second temperature value and $T_{corrected}$ is a corrected temperature value preset. In this embodiment, $T_{corrected}$ may be preferably 5 degrees centigrade.

In an embodiment, for the step S105, comparing a current temperature value detected by the temperature sensor with the temperature reference value, and controlling the heating unit to start or stop based on a comparison result may further include:

controlling the heating unit to stop if the current temperature value is greater than or equal to the temperature reference value;

controlling the heating unit to start if the current temperature value is less than the temperature reference value.

In addition, it should be noted that, after the heating unit is controlled to start or stop based on the comparison result, the heating unit of the cooking apparatus is controlled to start or stop through comparison between the current temperature value detected by the temperature sensor and the temperature reference value, instead of controlling by turning on and turning off the pressure switch repeatedly, thereby preventing the cooking apparatus from being adversely affected on its pressure range caused by accuracy of the pressure detecting unit, and controlling the temperature value inside the cooking apparatus in a more stable way with a reduced varying range.

In an embodiment, after controlling the heating unit to start or stop based on a comparison result, the method further includes:

detecting by the temperature sensor a third temperature value when the detected pressure value rises to the preset first pressure threshold again; and updating the temperature reference value according to the preset setting strategy using the third temperature value and the second temperature value.

Specifically, the temperature reference value is updated according to the preset setting strategy using the third temperature value and the second temperature value in a way similar with acquiring the temperature reference value according to the preset setting strategy using the first temperature value and the second temperature value, which will not be elaborated in this embodiment.

With the method for controlling the cooking apparatus provided in this embodiment, the heating unit of the cooking apparatus is controlled to start or stop based on the temperature value detected by the temperature sensor, thereby reducing use frequency of the pressure detecting unit, prolonging service life of the cooking apparatus, and controlling the pressure value inside the inner liner of the cooking apparatus in a more precise and stable way.

Embodiment 2

Based on the same technical concept of the foregoing embodiment, this embodiment provides detailed description for the technical solution of the foregoing embodiment. Reference is made in detail to the following specific examples.

By the reason that the heating unit will be controlled to stop heating when the pressure value detected by the pressure detecting unit rises to the first pressure threshold, after which the heating unit will be controlled to start heating again when the pressure value detected by the pressure detecting unit drops to the second pressure threshold, the pressure value detected by the pressure detecting unit will rise to the first pressure threshold more than one time; and will also drop to the second pressure threshold more than one time, in the operating process of the cooking apparatus.

Example 1

Figure 3:
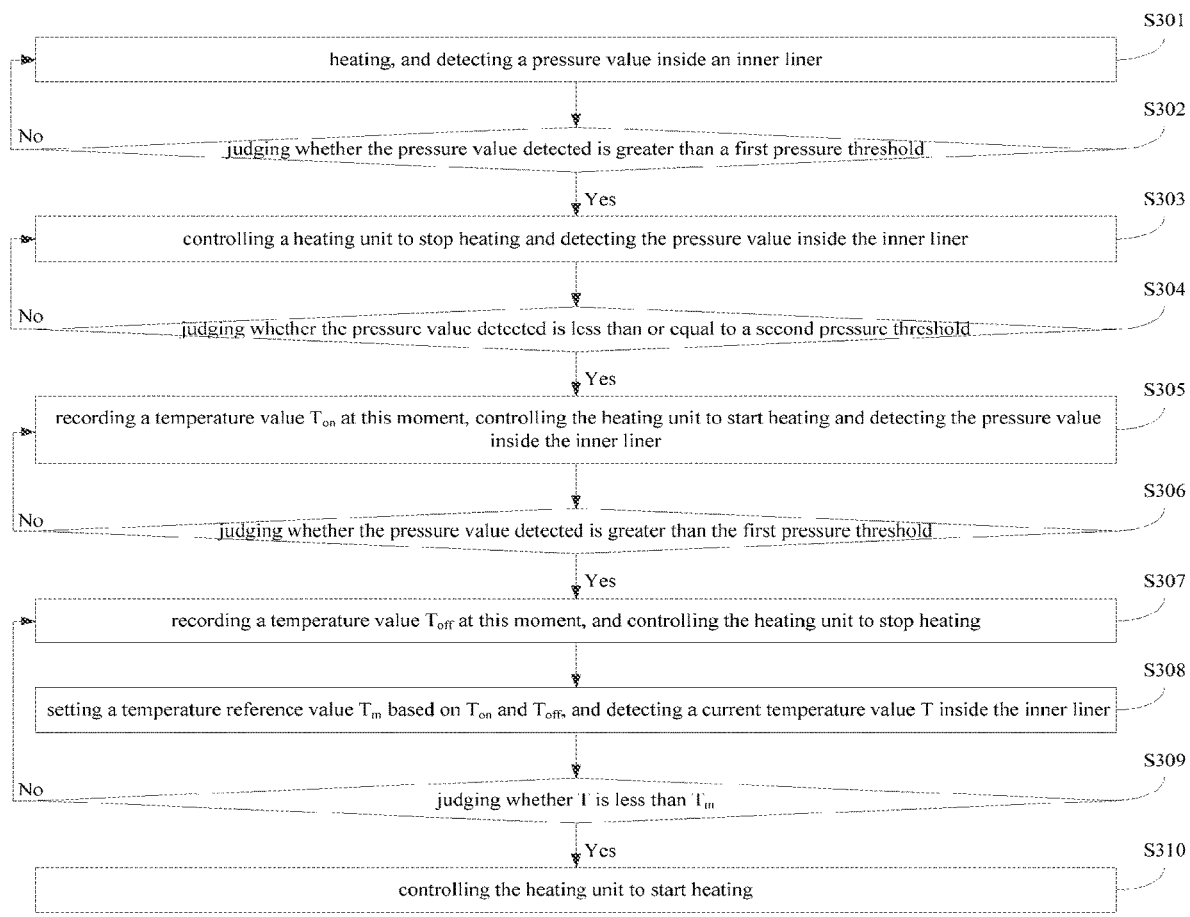
FIG. 3 is a schematic flow chart showing a specific implementation of a method for controlling a cooking apparatus according to an embodiment of the present disclosure.

Referring to FIG. 3, a specific operating process of the controlling method shown in this example includes:

S301: heating, and detecting a pressure value inside an inner liner;

S302: judging whether the pressure value detected is greater than a first pressure threshold P1; if yes, executing S303; if no, executing S301, i.e., heating, and detecting the pressure value inside the inner liner continuously;

S303: controlling a heating unit to stop heating and detecting the pressure value inside the inner liner (It would be appreciated that after the heating unit is controlled to stop heating, a temperature value inside the inner liner will drop gradually, resulting in a decreasing pressure value);

S304: judging whether the pressure value detected is less than or equal to a second pressure threshold P2; if yes, executing S305; if no, executing S303, i.e., detecting the pressure value inside the inner liner continuously;

S305: recording a temperature value Ton at this moment, controlling the heating unit to start heating and detecting the pressure value inside the inner liner;

S306: judging whether the pressure value detected is greater than the first pressure threshold; if yes, executing S307; if no, executing S305, i.e., detecting the pressure value inside the inner liner continuously;

S307: recording a temperature value Toff at this moment, and controlling the heating unit to stop heating;

S308: setting a temperature reference value Tm based on Ton and Toff, and detecting a current temperature value T inside the inner liner;

S309: judging whether T is less than Tm; if yes, executing S310; if no, executing S307, i.e., controlling the heating unit to keep in the stop state;

S310: controlling the heating unit to start heating.

The temperature value inside the inner liner is also detected in S309. If T is less than Tm, the heating unit is controlled to start heating; otherwise, the heating unit is controlled to stop heating.

Figure 4:
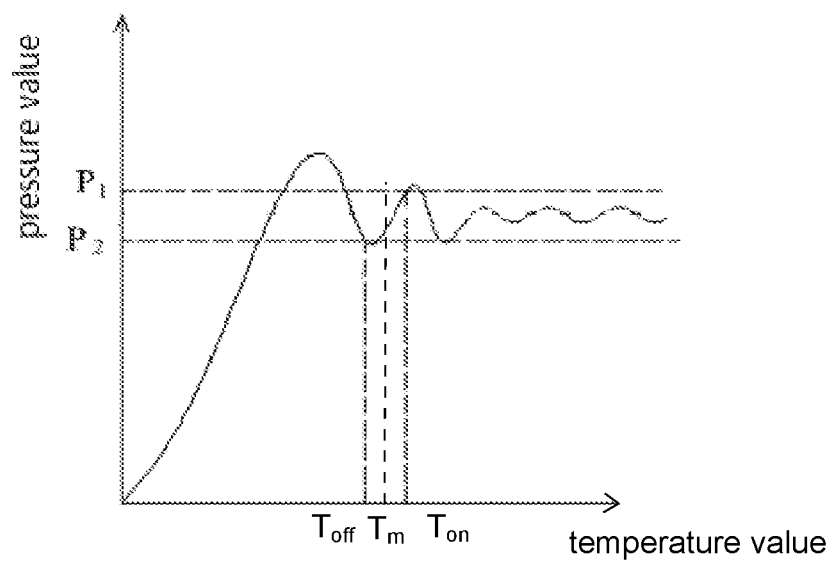
FIG. 4 is a schematic diagram showing an operating curve of a cooking apparatus according to an embodiment of the present disclosure.

With reference to an operating curve of the cooking apparatus as shown in FIG. 4, illustration can be made for the present operating process in combination with the same operating curve since the temperature value is in direct proportion to the pressure value inside the inner liner of the cooking apparatus. As can be seen from this operating curve that Toff is detected when the pressure value inside the inner liner of the cooking apparatus rises to the first pressure threshold for the second time, rather than the first time; while Ton is detected when the pressure value inside the inner liner drops to the second pressure threshold for the first time; and Tm is acquired based on Ton and Toff, so that the operating curve is fluctuated around Tm thereafter, rather than between the first pressure threshold P1 and the second pressure threshold P2, thereby controlling the pressure value or the temperature value inside the inner liner of the cooking apparatus in a more accurate and stable way.

With the operating process as shown in FIG. 3, the heating unit of the cooking apparatus is controlled to start or stop based on the temperature value detected during the operating process, which reduces use frequency of the pressure switch, and controlling the pressure value inside the inner liner of the cooking apparatus more precisely and smoothly as compared with a conventional operating process of controlling by the pressure switch in the prior art.

Example 2

Figure 5:
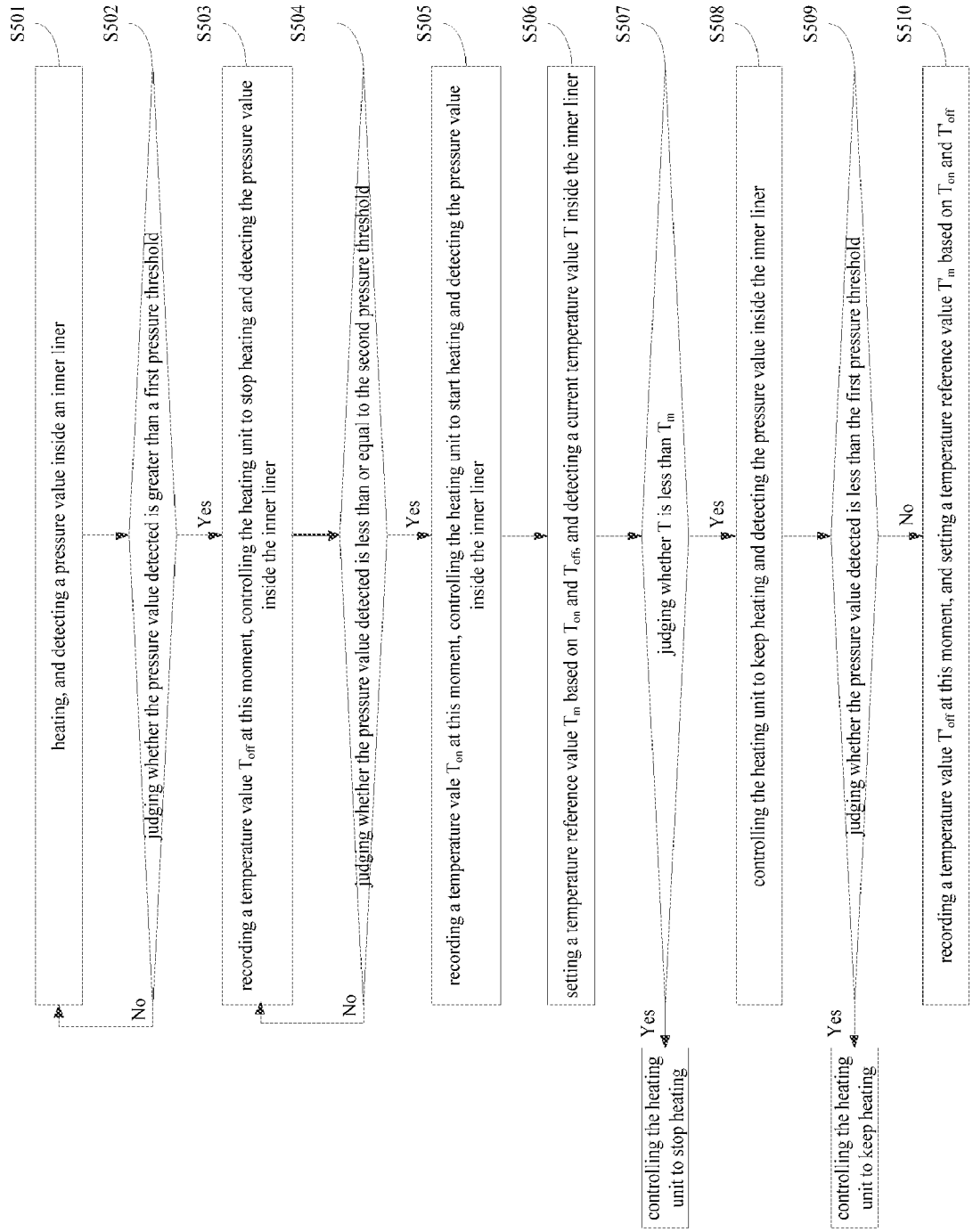
FIG. 5 is a schematic flow chart showing a specific implementation of another method for controlling a cooking apparatus according to an embodiment of the present disclosure.

Referring to FIG. 5, a specific operating process of the controlling method shown in this example includes:

S501: heating, and detecting a pressure value inside an inner liner;

S502: judging whether the pressure value detected is greater than a first pressure threshold P1; if yes, executing S503; if no, executing S501, i.e., heating, and detecting the pressure value inside the inner liner continuously;

S503: recording a temperature value Toff at this moment, controlling the heating unit to stop heating and detecting the pressure value inside the inner liner;

S504: judging whether the pressure value detected is less than or equal to the second pressure threshold P2; if yes, executing S505; if no, executing S503, i.e., controlling the heating unit to keep in the stop state and detecting the pressure value inside the inner liner;

S505: recording a temperature vale Ton at this moment, controlling the heating unit to start heating and detecting the pressure value inside the inner liner;

S506: setting a temperature reference value Tm based on Ton and Toff, and detecting a current temperature value T inside the inner liner;

S507: judging whether T is less than Tm; if yes, executing S508; if no, controlling the heating unit to stop heating;

S508: controlling the heating unit to keep heating and detecting the pressure value inside the inner liner.

It should be noted that, after the heating unit is controlled to start heating, the pressure value inside the inner liner will rise to the first pressure threshold again. Accordingly, the temperature reference value may also be updated, and thus the operating process may further include:

S509: judging whether the pressure value detected is less than the first pressure threshold P1; if yes, controlling the heating unit to keep heating; if no, executing S510;

S510: recording a temperature value T'off at this moment, and setting a temperature reference value T'm based on Ton and T'off.

The temperature value inside the inner liner is also detected for S509 and S510. If T is less than T'm, the heating unit is controlled to start heating; otherwise, the heating unit is controlled to stop heating.

Figure 6:
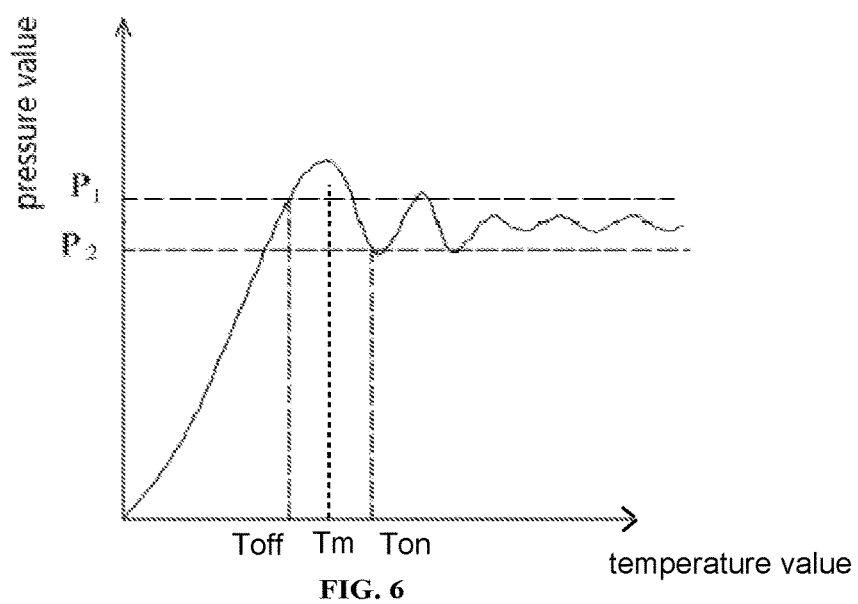
FIG. 6 is a schematic diagram showing another operating curve of a cooking apparatus according to an embodiment of the present disclosure.

With reference to an operating curve of the cooking apparatus as shown in FIG. 6, illustration can be made for the present operating process in combination with the same operating curve since the temperature value is in direct proportion to the pressure value inside the inner liner of the cooking apparatus. As can be seen from this operating curve that Toff is detected when the pressure value inside the inner liner of the cooking apparatus rises to the first pressure threshold for the first time; while Ton is detected when the pressure value inside the inner liner drops to the second pressure threshold for the first time; and Tm is acquired based on Ton and Toff, so that the operating curve is fluctuated around Tm thereafter, rather than between the first pressure threshold P1 and the second pressure threshold P2, thereby controlling the pressure value or the temperature value inside the inner liner of the cooking apparatus in a more accurate and stable way.

Embodiment 3

Figure 7:
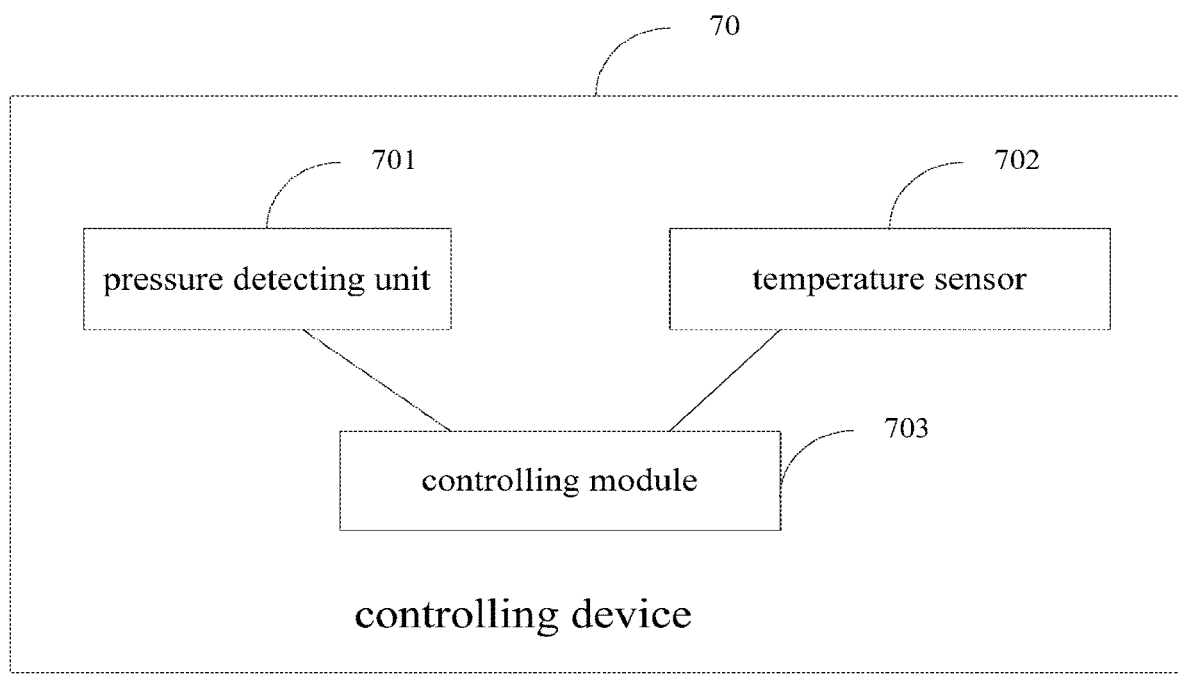
FIG. 7 is a block diagram showing a device for controlling a cooking apparatus according to an embodiment of the present disclosure.

Based on the same technical concept of the foregoing embodiments, referring to FIG. 7, a device 70 for controlling a cooking apparatus according to an embodiment of the present disclosure is shown. The controlling device 70 may include:

a pressure detecting unit 701 configured to detect a pressure value inside an inner liner in the pressure cooking apparatus;

a temperature sensor 702 configured to detect a temperature value inside the inner liner;

a controlling module 703 configured to: in a heating process, detect by the temperature sensor a first temperature value when the detected pressure value rises to a first preset pressure threshold;

detect by the temperature sensor a second temperature value when the detected pressure value drops from the preset first pressure threshold to a second preset pressure threshold;

acquire a temperature reference value according to a preset setting strategy using the first temperature value and the second temperature value; and compare a current temperature value detected by the temperature sensor with the temperature reference value, and control the heating unit to start or stop based on a comparison result.

In an embodiment, the controlling module 703 is further configured to set one temperature value within a range from the first temperature value to the second temperature value as the temperature reference value, in which the temperature reference value is less than the first temperature value and not less than the second temperature value.

In an embodiment, the controlling module 703 is further configured to acquire the temperature reference value Tm according to a formula as below:

$$T_m = \frac{(T_1 + T_2)}{2} + T_{corrected}$$

where T1 is the first temperature value, T2 is the second temperature value and $T_{corrected}$ is a corrected temperature value preset.

In an embodiment, the controlling module 703 is further configured to: control the heating unit to stop if the current temperature value is greater than or equal to the temperature reference value; control the heating unit to start if the current temperature value is less than the temperature reference value.

In an embodiment, the controlling module 703 is further configured to control the heating unit to stop when the pressure value detected by the pressure detecting unit rises to the preset first pressure threshold.

In an embodiment, the controlling module 703 is further configured to control the heating unit to start when the pressure value detected by the pressure detecting unit drops from the preset first pressure threshold to the second preset pressure threshold.

In an embodiment, after controlling the heating unit to start or stop based on a comparison result, the controlling module 703 is further configured to: detect by the temperature sensor a third temperature value when the pressure value detected by the pressure detecting unit rises to the preset first pressure threshold again; and update the temperature reference value according to the preset setting strategy using the third temperature value and the second temperature value.

It should be noted for the control device 70 as follows that:

the pressure detecting unit 701 may detect the pressure value indirectly with a magnetic sensor, such as a magnetic float, which will rise under increasing pressure; or with a temperature sensor based on the Ideal Gas Law, and so on; and the temperature sensor 702 may be a top thermostat provided at the top of the upper cover, which may be implemented by a built-in temperature sensor.

The heating unit of the cooking apparatus may be provided at a pot body and closely adhered to the inner wall of the inner liner. The specific forms of the heating unit may include a common disk electric-heating unit, a coil disk electromagnetic heating unit, an infrared light wave heating unit and the like, which will not be elaborated in this embodiment.

With the device 70 for controlling of the cooking apparatus provided in this embodiment, the heating unit of the cooking apparatus is controlled to start or stop based on the temperature value detected by the temperature sensor, thereby reducing use frequency of the pressure detecting unit, prolonging service life of the cooking apparatus, and controlling the pressure value inside the inner liner of the cooking apparatus in a more precise and stable way.

In addition, an embodiment of the present disclosure further provides a cooking apparatus, which includes the above device for controlling the cooking apparatus.

With the cooking apparatus provided in this embodiments of the present disclosure, the heating unit of the cooking apparatus is controlled to start or stop based on the temperature value detected by the temperature sensor, thereby reducing use frequency of the pressure detecting unit, prolonging service life of the cooking apparatus, and controlling the pressure value inside the inner liner of the cooking apparatus in a more precise and stable way.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may include one or more this feature. In the description of the present disclosure, the term of "a plurality of" means two or more than two, unless specified otherwise.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discreet logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the present disclosure, the terms "mounted", "connected", "coupled", "fixed" and the like should be understood broadly. The "connection" may be, for example, fixed connections, detachable connections, or integral connections; may also be direct connections or indirect connections via intermediation. The specific meaning of the above terms could be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a pressure cooking apparatus, wherein the pressure cooking apparatus comprises a heating unit, an inner liner, a pressure detecting unit and a temperature sensor, the method comprising:

initiating a heating process of the heating unit to start heating inside the pressure cooking apparatus;

detecting by the pressure detecting unit a pressure value inside the inner liner during the heating process of the heating unit;

detecting by the temperature sensor a first temperature value when the detected pressure value rises to a first preset pressure threshold for a first time;

controlling the heating unit to stop heating;

detecting by the temperature sensor a second temperature value when the detected pressure value drops from the preset first pressure threshold to a second preset pressure threshold;

controlling heating unit to restart heating;

detecting by the temperature sensor a third temperature value when the detected pressure value rises to the first preset pressure threshold for a second time;

acquiring a temperature reference value according to a preset setting strategy using the third temperature value and the second temperature value; and comparing a current temperature value detected by the temperature sensor with the temperature reference value, and controlling the heating unit to start or stop based on a comparison result.

2. The method according to claim 1, wherein acquiring a temperature reference value according to a preset setting strategy using the third temperature value and the second temperature value further comprises:

setting one temperature value within a range from the first temperature value to the second temperature value as the temperature reference value, wherein the temperature reference value is less than the third temperature value and not less than the second temperature value.

3. The method according to claim 1, wherein acquiring a temperature reference value according to a preset setting strategy using the third temperature value and the second temperature value further comprises:

acquiring the temperature reference value Tm according to a formula as below:

$$T_m = \frac{(T_1 + T_2)}{2} + T_{corrected}$$

where T1 is the third temperature value, T2 is the second temperature value and $T_{corrected}$ is a corrected temperature value preset.

4. The method according to claim 1, wherein controlling the heating unit to start or stop based on a comparison result further comprises:

controlling the heating unit to stop if the current temperature value is greater than or equal to the temperature reference value; and controlling the heating unit to start if the current temperature value is less than the temperature reference value.

5. A device for controlling a pressure cooking apparatus, comprising:

a pressure detecting unit configured to detect a pressure value inside an inner liner in the pressure cooking apparatus;

a temperature sensor configured to detect a temperature value inside the inner liner;

a controlling module configured to, during a heating process, initiate a heating process of the heating unit to start heating inside the pressure cooking apparatus;

detect by the pressure detecting unit a pressure value inside the inner liner during the heating process of the heating unit;

detect by the temperature sensor a first temperature value when the detected pressure value rises to a first preset pressure threshold for a first time;

control the heating unit to stop heating;

detect by the temperature sensor a second temperature value when the detected pressure value drops from the preset first pressure threshold to a second preset pressure threshold for a first time;
control the heating unit to restart heating;
detect by the temperature sensor a third temperature value when the detected pressure value rises to the first preset pressure threshold for a second time;
acquire a temperature reference value according to a preset setting strategy using the third temperature value and the second temperature value; and
compare a current temperature value detected by the temperature sensor with the temperature reference value, and control the heating unit to start or stop based on a comparison result.

6. The device according to claim 5, wherein the controlling module is further configured to set one temperature value within a range from the third temperature value to the second temperature value as the temperature reference value, wherein the temperature reference value is less than the third temperature value and not less than the second temperature value.

7. The device according to claim 5, wherein the controlling module is further configured to acquire the temperature reference value Tm according to a formula as below:

$$T_m = \frac{(T_1 + T_2)}{2} + T_{corrected}$$

where T1 is the third temperature value, T2 is the second temperature value and $T_{corrected}$ is a corrected temperature value preset.

8. The device according to claim 5, wherein the controlling module is further configured to:
control the heating unit to stop if the current temperature value is greater than or equal to the temperature reference value; and
control the heating unit to start if the current temperature value is less than the temperature reference value.

9. A pressure cooking apparatus comprising a heating unit, an inner liner, a pressure detecting unit and a temperature sensor, and a device for controlling a pressure cooking apparatus, wherein the pressure cooking apparatus further includes:
a pressure detecting unit configured to detect a pressure value inside the inner liner in the pressure cooking apparatus;
a temperature sensor configured to detect a temperature value inside the inner liner;
a controlling module configured to, during a heating process,
initiate a heating process of the heating unit to start heating inside the pressure cooking apparatus;
detect by the pressure detecting unit a pressure value inside the inner liner during the heating process of the heating unit;
detect by the temperature sensor a first temperature value when the detected pressure value rises to a first preset pressure threshold for a first time;
control the heating unit to stop heating;
detect by the temperature sensor a second temperature value when the detected pressure value drops from the preset first pressure threshold to a second preset pressure threshold for a first time;
control the heating unit to restart heating;
detect by the temperature sensor a third temperature value when the detected pressure value rises to the first preset pressure threshold for a second time;
acquire a temperature reference value according to a preset setting strategy using the third temperature value and the second temperature value; and
compare a current temperature value detected by the temperature sensor with the temperature reference value, and control the heating unit to start or stop based on a comparison result.

10. The pressure cooking apparatus according to claim 9, wherein the controlling module is further configured to set one temperature value within a range from the third temperature value to the second temperature value as the temperature reference value, wherein the temperature reference value is less than the third temperature value and not less than the second temperature value.

11. The pressure cooking apparatus according to claim 9, wherein the controlling module is further configured to acquire the temperature reference value Tm according to a formula as below:

$$T_m = \frac{(T_1 + T_2)}{2} + T_{corrected}$$

where T1 is the third temperature value, T2 is the second temperature value and $T_{corrected}$ is a corrected temperature value preset.

12. The pressure cooking apparatus according to claim 9, wherein the controlling module is further configured to:
control the heating unit to stop if the current temperature value is greater than or equal to the temperature reference value; and
control the heating unit to start if the current temperature value is less than the temperature reference value.

* * * * *